United States Patent
Motoyama

(10) Patent No.: US 9,648,186 B2
(45) Date of Patent: May 9, 2017

(54) SCANNING APPARATUS AND SHEET CONVEYER

(71) Applicant: BROTHER KOGYO KABUSHIKI KAISHA, Nagoya-shi, Aichi-ken (JP)

(72) Inventor: Toshiki Motoyama, Konan (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/830,422

(22) Filed: Aug. 19, 2015

(65) Prior Publication Data

US 2016/0057301 A1 Feb. 25, 2016

(30) Foreign Application Priority Data

Aug. 21, 2014 (JP) ................. 2014-168844

(51) Int. Cl.
*H04N 1/00* (2006.01)
*H04N 1/32* (2006.01)

(52) U.S. Cl.
CPC ....... *H04N 1/00663* (2013.01); *H04N 1/3263* (2013.01)

(58) Field of Classification Search
USPC ....... 358/1.2, 1.9, 1.12–1.14, 504, 505, 406, 358/413, 498
See application file for complete search history.

(56) References Cited

U.S. PATENT DOCUMENTS

| | | | |
|---|---|---|---|
| 2005/0275162 A1* | 12/2005 | Sano | B65H 7/125 271/291 |
| 2010/0020370 A1 | 1/2010 | Ishikawa | |
| 2012/0093525 A1* | 4/2012 | Ota | B41J 11/006 399/21 |
| 2013/0083374 A1* | 4/2013 | Nagai | H04N 1/00652 358/488 |

FOREIGN PATENT DOCUMENTS

| | | |
|---|---|---|
| JP | 2010-28546 A | 2/2010 |
| JP | 2012-58588 A | 3/2012 |

* cited by examiner

*Primary Examiner* — Marcellus Augustin
(74) *Attorney, Agent, or Firm* — Merchant & Gould P.C.

(57) ABSTRACT

A scanning apparatus is provided with a conveyer having a plurality of conveying rollers and configured to convey an original sheet, a scanning device configured to scan the original sheet, and a controller. The controller is configured to execute a detection process of detecting an error which causes stoppage of conveying the original sheet by the conveyer, an identifying process of identifying a type of the error detecting in the detecting process, and a notification process of notifying a user of an operation which the controller encouraging the user to execute when the controller causes the conveyer to re-convey the original sheet that has been stopped, depending on the type of the error identified by the identifying process.

18 Claims, 12 Drawing Sheets

SCANNING APPARATUS AND SHEET CONVEYER

CROSS-REFERENCE TO RELATED APPLICATION

This application claims priority under 35 U.S.C. §119 from Japanese Patent Application No. 2014-168844 filed on Aug. 21, 2014. The entire subject matter of the application is incorporated herein by reference.

BACKGROUND

Technical Field

The present disclosures relate to a scanning apparatus configured to scan an image on an original sheet conveyed in the scanning apparatus, and a sheet conveyer which can be employed in such a scanning apparatus. Further, the present disclosures particularly relate to a technique of notifying a user of errors which occur when a sheet is being conveyed in such a scanning apparatus and/or by such a sheet conveyer.

Related Art

It has been known that, in a conventional sheet conveyer or a conventional scanning apparatus employing such a conventional sheet conveying apparatus, an error may occur such that conveyance of the sheet is stopped when the sheet is being conveyed. Conventionally, in such a conventional scanning apparatus or the conventional sheet conveyer, there is known a technique of notifying a user of a method of releasing such an error.

For example, in the conventional scanning apparatus, when an error occurs and conveyance of an original sheet is interrupted due to a sheet jam or the like, a notification is made to encourage a user to re-place the original sheet, which is to be scanned, on a flatbed glass after the error is released (i.e., a cause of the error is removed).

SUMMARY

In the conventional technique as described above, however, there is a problem as follows. That is, there is a case where the original sheet is automatically conveyed after the error is released. In such a case, if the original sheet is not broken (e.g., torn), the same original sheet will be conveyed in the same situation. In such a conventional apparatus, however, no instructions may be given to the user to improve a success rate in handling the sheet after the error condition is released. That is, since the original sheet will be conveyed in a manner similar to a case when the error has occurred, the same error may be repeated.

In consideration of the above, the present disclosures provide an improved scanning apparatus or the like which employs the sheet conveyer, with which a possibility of reoccurrence of the error condition regarding conveyance of the sheet is reduced.

According to aspects of the disclosures, there is provided a scanning apparatus, which is provided with a conveyer having a plurality of conveying rollers and configured to convey an original sheet, a scanning device configured to scan the original sheet, and a controller. The controller is configured to execute a detection process of detecting an error which causes stoppage of conveying the original sheet by the conveyer, an identifying process of identifying a type of the error detecting in the detecting process, and a notification process of notifying a user of an operation to be executed by the user, depending on the type of the error identified by the identifying process, to cause the conveyer to re-convey the original sheet that has been stopped.

According to other aspects of the disclosures, there is provided a sheet conveyer, which is provided with a conveyer configured to convey a sheet with user of a plurality of conveying rollers and a controller. The controller is configured to execute a detection process of detecting an error which causes stoppage of conveyance of the sheet by the conveyer, an identification process of identifying a type of the error detected in the detection process, and a notification process of notifying a user of a recommendable operation to re-execute conveyance of the sheet, which has caused stoppage of the conveyance, based on the type of the error identified by the identification process.

According to other aspects of the disclosures, there is provided a scanning apparatus, which is provided with a conveyer having a plurality of conveying rollers and configured to convey an original sheet, a scanning device configured to scan the original sheet, a plurality of sensors configured to detect a plurality of types of errors which cause stoppage of conveyance of the original sheet by the conveyer, respectively, a notifying device and a controller. The controller is configured to identify, when one of the plurality of sensors detects an error, a type of the error depending on the one of the plurality of sensors that detects the error, and cause the notification device to notify a user of an operation to be performed by the user before the controller causes the conveyer to re-convey the original sheet based on the type of the identified error.

BRIEF DESCRIPTION OF THE ACCOMPANYING DRAWINGS

DETAILED DESCRIPTION

Hereinafter, referring to the accompanying drawings, a scanning apparatus according to an illustrative embodiment and a modified embodiment will be described. It is noted that, in the following description, a scanner configured to scan an image on an original sheet with conveying the original sheet will be described as an illustrative embodiment of the scanning apparatus and a conveyer which can be employed in the scanning apparatus.

Figure 1:
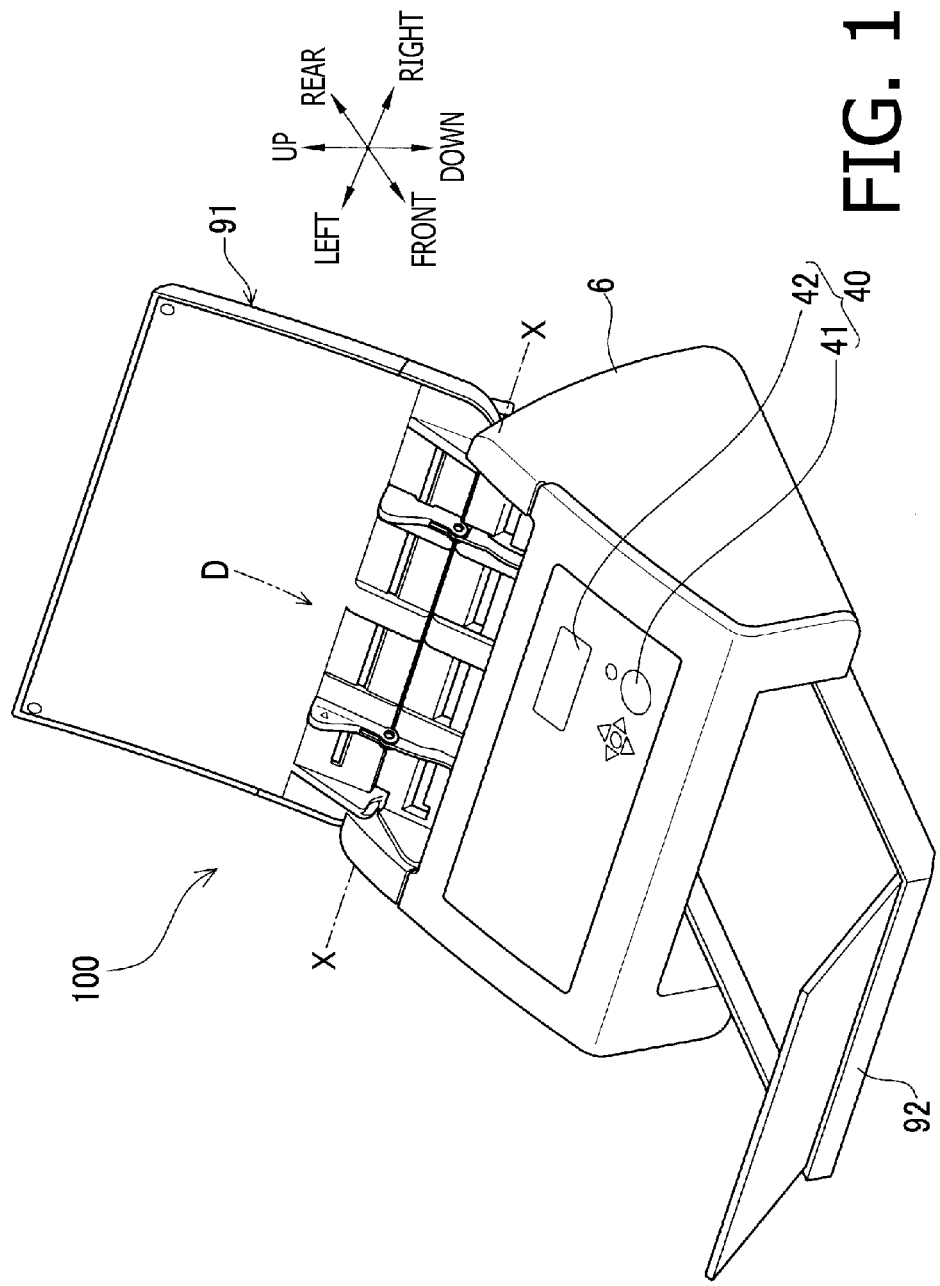
FIG. 1 is a perspective view showing an appearance of a scanner according to an illustrative embodiment of the present disclosures.

A scanner 100 according to the illustrative embodiment has, as shown in FIG. 1, a casing 6, an original sheet tray 91, and a catch tray 92. The casing 6 surrounds a main body of the scanner 100. The original tray 91 is supported by the casing 6 such that the original tray 91 is rotatable amount a rotation axis X, which is defined at an upper rear portion of the casing 6 and extends in a right-left direction in FIG. 1. The catch tray 92 is arranged at a lower portion of the casing such that the catch tray 92 can be inserted/retracted in a front-read direction. It is noted that the original sheet tray 91 is an example of a sheet tray. It is noted that, in FIG. 1, on a side where the catch tray 92 is arranged with respect to the casing 6 is defined as a front side, a left-hand side when facing the catch tray 92 is defined as a left side of the scanner 100, and a right-hand side when facing the catch tray 92 is defined as a right side of the scanner 100.

The scanner 100 has an operation panel 40 which has a button group 41 and a display 42 on an upper surface of the casing 6. The button group 41 is provided with various buttons/keys (e.g., a start key, a stop key, ten keys, etc.), and the display 42 is provided with an LCD (liquid crystal display). Messages and the like are displayed for the user on the display 42, while the user can input operational commands and the like with the button group 41.

Figure 2:
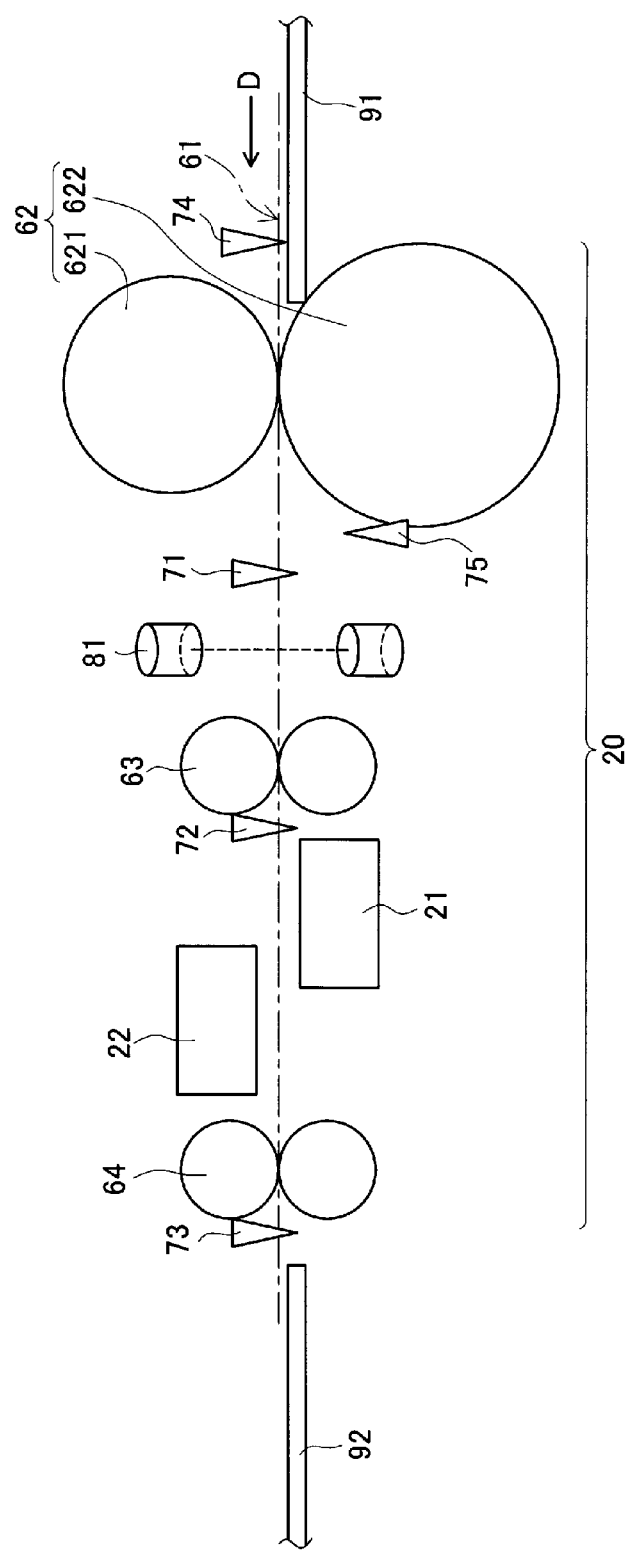
FIG. 2 is a side view schematically showing an inner configuration of the scanner according to the illustrative embodiment of the disclosures.

FIG. 2 schematically shows an inner configuration of the scanner 100. Inside the casing 6 of the scanner 100, a conveying path 61 is defined. The conveying path 61 is a path connecting an original sheet tray 91 and the catch tray 92, and the original sheet is to be conveyed along the conveying path 61. Along the conveying path 61, a sheet sensor 74, a separation roller pair 62, a rolling-in sensor 75, a sheet sensor 71, an ultrasonic sensor 81, a pair of first conveying rollers 63, a sheet sensor 72, image sensors 21 and 22, a pair of second conveying rollers 64 and a sheet sensor 73 are arranged from an upstream side to a downstream side in this order. In the following description, the above-described components used to scan the original sheet will be collectively referred to as an image scanning device 20.

The separation roller pair 62 has a pair of rollers 621 and 622. According to the illustrative embodiment, the scanner 100 is configured to operate in two operation modes, which are a separation mode and a non-separation mode, in regard with an operation of the separation roller pair 62. In the non-separation mode, the roller 622 is rotated in a direction for introducing the original sheet inside the scanner 100, and let the roller 621 follow the rotation of the roller 622. In the separation mode, unlike the non-separation mode, the roller 621 is controlled to rotate in a direction opposite to the rotating direction of the roller 622. It is noted that the non-separation mode is an example of a first mode, while the separation mode is an example of a second mode.

In the separation mode, the upper roller 621 is controlled to rotate in a direction to suppress introduction of the original sheet into the scanner 100. Accordingly, it is likely that an overlapped sheet can be well separated. That is, it is less possible that an overlapped conveying occurs, that is, it is less possible that a plurality of original sheets are conveyed in an overlapped state. The non-separation mode is appropriate for a folded original sheet, an original sheet on which a tag paper (seal) or sticker is adhered, an original to be conveyed with use of a carrier sheet. However, in the non-separation mode, the overlap conveying may occur easily. The scanner 100 is configured to acquire a user setting of the operation mode when the original sheet is conveyed (i.e., the separation mode or the non-separation mode) through the operation panel 40. According to the illustrative embodiment, the initial setting of the operation mode is non-separation mode.

The first conveying roller pair 63 has a pair of rollers and is configured to convey the original sheet introduced by the separation roller pair 62 toward the second conveying roller pair 64. The second conveying roller pair 64 also includes a pair of rollers and is configured to convey the original sheet conveyed by the first conveying roller pair 63 toward the catch tray 92. It is noted that the first conveying roller pair 63, the second conveying roller pair 64 and the separation roller pair 62 are examples of a conveyer.

The image sensors 21 and 22 are configured such that one is used to scan an image on one surface of the original, and the other is used to scan an image on the other surface of the original. Each of the image sensors 21 and 22 is configured such that a plurality of photo sensors arrange in line in the right-left direction (i.e., a direction perpendicular to a plane of FIG. 2), and converts light reflected by the original sheet to an electrical signal, and outputs the same. As the image sensors 21 and 22, for example, a CIS (contact image sensor) or a CCD (charge coupled device) may be used. According to the image sensors 21 and 22, a color image, a gray scale image, and a monochrome image can be scanned. The images sensors 21 and 22 are examples of a scanning device. Further, one of the image sensors 21 and 22 is an example of a first scanning device, while the other of the image sensors 21 and 22 is an example of a second scanning device.

Sheet sensors 71, 72 and 73 are photo sensors provided with movable bodies, respectively. The sheet sensors 71, 72 and 73 are configured to output signals each having different levels depending on whether the original sheet is located at respective detection positions. Each of the movable bodies is configured such that, when no original sheet is located at the detection position, each movable body is located at a reference position at which a portion thereof protrudes toward the conveying path 61. When the original sheet is located at the detection position, each movable body is pushed by the original sheet and is displaced to a position other than the reference position. When the original sheet passes the detection position and there becomes no sheet at the detection positions, each movable body returns to the reference position by its own-weight and/or an urging force applied by an elastic member such as a spring.

The sheet sensor 74 is a photo sensor which does not have a movable member. The sheet sensor 74 has a light emitting element and a light receiving element which face each other with a through hole formed on the original sheet tray 91 therebetween. When the original sheet is placed on the original sheet tray 91, the original sheet blocks the light emitted by the light emitting element and directed toward the light receiving element, thereby the light receiving element does not receive the light. As above, each of the sheet sensors 71, 72, 73 and 74 outputs different level of signals depending on whether the original sheet is located at respective detection points. According to the illustrative embodiment, each of the sheet sensors 71, 72, 73 and 74 outputs an ON level signal when the original sheet is located at the detection point, and an OFF level signal when the original sheet is not located at the detection point.

As described above, the sheet sensors 71, 72, 73 and 74 are used to determine the presence/absence of the original sheet at respective detection positions in the conveying path. For example, based on the output of the sheet sensor 74, presence/absence of the original sheet on the original sheet tray 91 can be determined. Further, based on the output of the sheet sensor 71, it is determined whether introduction of the original sheet inside the scanner 100 is succeeded or not. Furthermore, after the original sheet is successfully introduced inside the scanner 100, based on the outputs of the sheet sensors 72 and 73, it is determined whether the original sheet has been successfully conveyed to respective detection positions. Still further, based on the output of the sheet sensor 72, which is arranged immediately on an upstream side with respect to the image sensors 21 and 22, timings at which the image sensors 21 and 22 start scanning can be controlled. It is noted that the sheet sensors 71, 72 and 73 are examples of inside-path sheet sensors.

The rolling-in sensor 75 is arranged on a downstream side, in the conveying direction, with respect to the separation roller pair 62, and further, the around the lower roller 622 of the separation roller pair 62. Further, a detection position of the rolling-in sensor 75 is a lower position with respect to the conveying path 61. That is, the detection position of the rolling-in sensor 75 is the position which is outside the conveying path 61 in a direction perpendicular to both the sheet conveying direction and an axial direction of the separation roller pair 62.

The rolling-in sensor 75 is, similar to the sheet sensor 71 and the like, the light-transmission type sensor provided with the movable body, and outputs different level signals depending on whether the original sheet is located at its detection position. According to the illustrative embodiment, the rolling-in sensor 75 outputs an ON level signal when the original sheet is present at the detection position, and an OFF level signal when the original sheet is absent at the detection position. The rolling-in sensor 75 is used to determine whether the original sheet is curled so that a sheet jam would occur. According to the illustrative embodiment, the rolling-in sensor 75 is used to detect whether the original sheet is caught in the separation roller pair 62. It is noted that the rolling-in sensor 75 is an example of an outside-path sheet sensor.

The ultrasonic sensor 81 is a transmission type sensor having an ultrasonic wave transmitter and an ultrasonic wave receiver, and outputs a different level signal depending on a difference of a thickness of the original sheet passing through between the ultrasonic wave transmitter and the ultrasonic wave receiver. When a plurality of original sheets are conveyed in the overlapped state, the amplitude of ultrasonic wave the ultrasonic wave receiver receives is attenuated in comparison with a case where a single original sheet is conveyed.

According to the illustrative embodiment, based on the output of the sheet sensor 71, the ultrasonic sensor 81 outputs the ultrasonic wave at a timing when the original sheet is located at its detection position. When it is estimated that there are multiple sheets at the detection position, the ultrasonic sensor 81 outputs an ON level signal, and otherwise, the ultrasonic sensor 81 outputs an OFF level signal. As above, the ultrasonic sensor 81 is used to determine the overlap conveying of the original sheet. It is noted that the ultrasonic sensor 81 is an example of the overlap conveyance sensor.

It is noted that the detection of the overlap conveying based on the output of the ultrasonic sensor 81 is disabled. When the original sheet on which a tag seal, a sticky tag or the like is adhered or a folded original sheet is conveyed, the ultrasonic sensor 81 may output the OFF level signal, which means the overlap conveying, and the scanning may not be executed. In order to avoid such a situation, the scanner 100 according to the illustrative embodiment is configured to acquire a user input, through the operation panel 4, of disabling the detection of the overlap conveying with use of the ultrasonic sensor 81. When the detection of the overlap conveying is disabled, the scanner 100 does not receive the output of the ultrasonic sensor 81, or receives the output of the ultrasonic sensor 81 but does not use the output of the ultrasonic sensor 81 for the error detection. When the detection of the overlap conveying is not disabled, the detection of the overlap conveying is enabled. In the latter case, when the overlap conveying is detected, the scanner 100 stops conveying the original sheet.

The original sheet placed on the original sheet tray 91 is conveyed toward the catch tray 92 along the directions indicated by arrows D in FIG. 1 and FIG. 2. For example, when the scanning is executed, a plurality of original sheets are placed on the original sheet tray 91. Then, one of the original sheets placed on the original sheet tray 91 is fed toward the downstream side by the separation roller pair 62. The original sheet is scanned by the image sensor 21 or 22 as the original sheet is conveyed along the conveying path 61. After being scanned, the original sheet is ejected from the scanner 100 and caught by the catch tray 92.

The scanner 100 generates an image file (e.g., a JPEG file or the like) based on the scanned image of the original sheet. Then, the thus generated image file is stored in a storage designated by the user.

Figure 3:
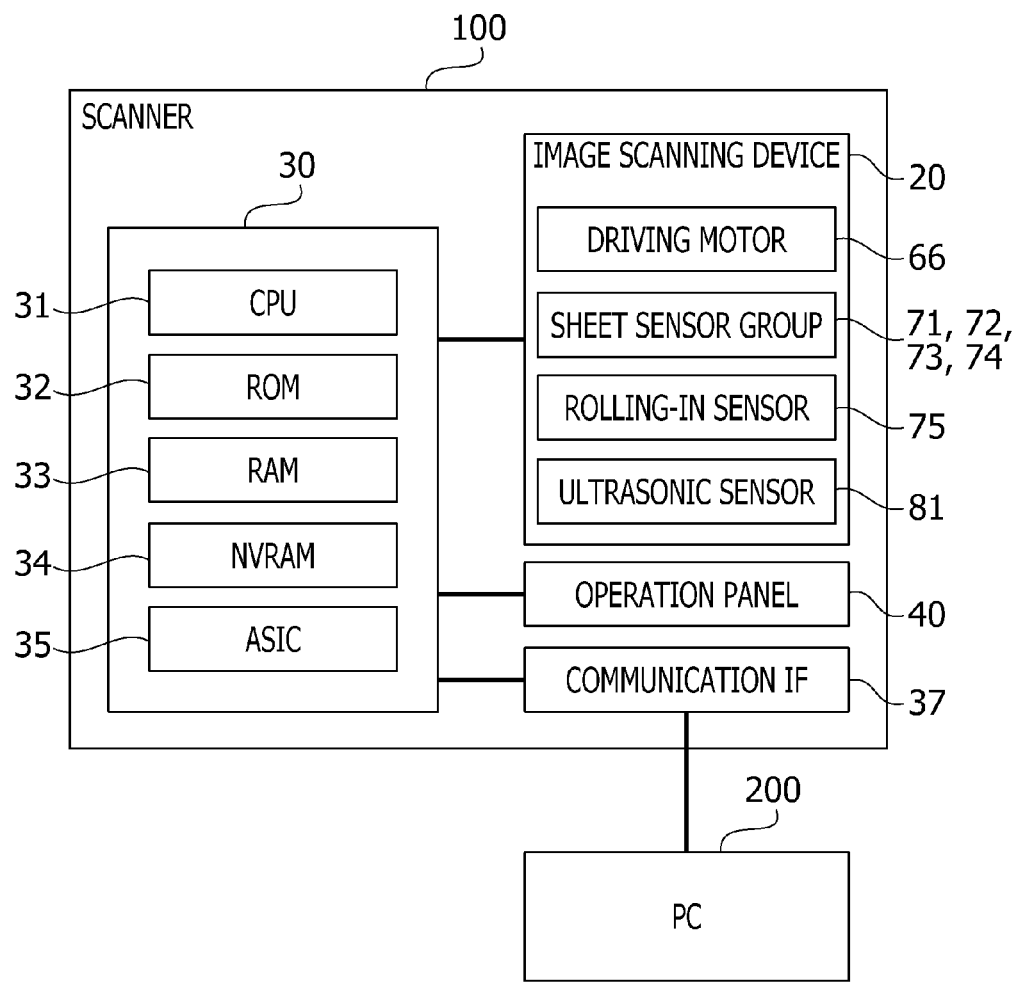
FIG. 3 is a block diagram showing an electrical configuration of the scanner according to the illustrative embodiment of the disclosures.

As shown in FIG. 3, the scanner 100 has a controller 30 provided with a CPU (central processing unit) 31, a ROM (read only memory) 32, a RAM (random access memory) 33, an NVRAM (non-volatile RAM) 34 and an ASIC (application specific integrated circuit) 45. The scanner 100 has, as described above, the image scanning device 20, the operation panel 40, a communication interface 37, which are controlled by the CPU 31.

The image scanning device 20 includes, as described above, the sheet sensors 71, 72, 73 and 74, the rolling-in sensor 75 and the ultrasonic sensor 81. The image scanning device 20 further includes a driving motor 66 which serves as a driving source of the separation roller pair 62, the first conveying roller pair 63, the second conveying roller pair 64 and the like. It is noted that the term "controller" 30 is a collective term including the hardware used to control the operations of the scanner 100 and is not necessarily represent a single hardware components, but may include a plurality of components.

The ROM 32 stores firmware representing a control program for the scanner 100, various settings, initial values and the like. The RAM 33 is used as a work area when control programs are retrieved/executed and/or a storage area for temporarily storing image data and the like.

The CPU 31 controls respective components of the scanner 100 in accordance with control programs retrieved from the ROM 32 and various signals transmitted from respective sensors, with storing its execution results in the RAM 33 or the NVRAM 34. It is noted that the CPU 31 is an example of a controller. It is further noted that the controller 30 may include a controlling device and/or the ASIC 35.

The communication interface 37 is hardware which enables the scanner 100 to communicate with a personal computer (hereinafter, referred to as a PC) 200. As a concrete example of the communication interface 37, a wired LAN (local area network) interface, a wireless LAN interface, and a serial communication interface are known. The scanner 100 is configured to transmit image data to the PC 200 through the communication interface 37. It is noted that an external device with which the scanner 100 can communicate through the communication interface 37 should not be limited to the PC 200. For example, the scanner 100 can communicate with a smartphone, a server, a flash memory and the like.

The scanning and conveying process (FIG. 4) is started by the CPU 31 in response to receipt of a scanning start command. It is noted that, in the following description, steps executed by the CPU 31 will also be described such that the scanner 100 executes steps.

In the scanning and conveying process, the scanner 100 firstly starts conveying the original sheet (S101). That is, in S101, the scanner 100 starts driving the driving motor 66 so that the separation roller pair 62, the first conveying roller pair 63, the second conveying roller pair 64 are rotated, thereby the original sheet being started to be conveyed. Further, the scanner 100 starts scanning of the original sheet with the image sensor 21 in synchronization with conveyance of the original sheet. When both surfaces of the original sheet are to be scanned, the scanner 100 starts scanning with use of both the image sensors 21 and 22. When there are a plurality of original sheets to be scanned, the original sheets are conveyed one by one and repeats the scanning operation, until no original sheet is left in the original sheet tray.

After execution of S101, the scanner 100 determines whether an error to stop conveying the original sheet has occurred during the conveyance of the original sheet (S102). Examples of the error causing stoppage of conveying the original sheet include cases where the rolling-in sensor exhibits the ON level, the ultrasonic sensor 81 exhibits the ON level, a length of the original sheet which is calculated based on the output of the sheet sensor 71 is shorter than a longest distance between two adjacent rollers along the conveying path 61, changes of present/absent statuses of the original sheet in accordance with the outputs of the sheet sensors 71, 72 and 73 have not occurred at predetermined timings, and the like. It is noted that S102 is an example of a detection process.

It is noted that the changes of the present/absent statuses of the original sheet have not occurred at the predetermined timings, at least one of three cases below may be occurring.

In a first case, a continuing time of the presence of the original sheet is shorter than a first threshold time period. When the sheet length in the conveying direction of the original sheet is shorter than the longest distance, along the conveying path 61, between the two adjacent rollers, the original sheet falls between the two rollers and cannot be conveyed any more. Therefore, when the continuing time of the presence of the original sheet is shorter than the first threshold time period that corresponds to a time period necessary for the original sheet to pass the longest distance, it is determined that the error has occurred.

In a second case, the continuing time of the presence of the original sheet is shorter than a second threshold time period. When the conveyance of the original sheet is prevented due to idly rotation of a roller or sheet jam, the continuing time period of the presence of the original sheet becomes longer than an actual time period which is normally necessary for the original sheet to pass respective detection positions. Therefore, when the continuing time of the presence of the original sheet is longer than the second threshold time period that corresponds to a time period necessary for the original sheet having a largest supportable size to pass through the respective detection positions, it is determined that the error has occurred.

In a third case, after an upstream side sheet sensor exhibits a change from the absent status to the present status of the original sheet, a downstream side sheet sensor does not exhibit a change from the presence to the absence of the original sheet in a predetermined timing. Similarly to the second case, when the original sheet is in an unmovable state due to the sheet jam or the like, even if the upstream side sensor exhibits the status change from the absence to the presence of the original sheet, the downstream side sheet sensor does not exhibit the change from the present status to absent status of the original sheet. Therefore, when the downstream side sheet sensor does not exhibit the change from the present status to the absent status before a time period corresponding to a time period necessary for the original sheet to reach the downstream side sheet sensor after the upstream side sheet sensor exhibits the change from the absent status to the present status, it is determined that the error has occurred.

When an error which causes stoppage of conveyance of the original sheet is not occurring (S102: NO), the scanner 100 determines whether a job is completed (S103). Completion of a job is determined, for example, when there is no original sheet on the original sheet tray 91 and all the original sheets have been conveyed and scanned, or when a cancel key of the operation panel has been depressed. It is noted that the presence/absence of the original sheet on the original sheet tray 91 can be determined based on the output of the sheet sensor 74.

When the job has not been completed (S103: NO), the scanner 100 returns to S102 and repeats executing S102 and S103 until an error occurs or the job is completed. When the job has been completed (S103: YES), the scanner 100 terminates the scanning and conveying process.

When an error causing stoppage of conveying the original sheet has occurred (S102: YES), the scanner 100 stops conveying the original sheet (S111). Thereafter, the scanner 100 executes an error identification process (S112) to identify a type of the occurred error. It is noted that S112 is an example of an identification process.

Figure 4:
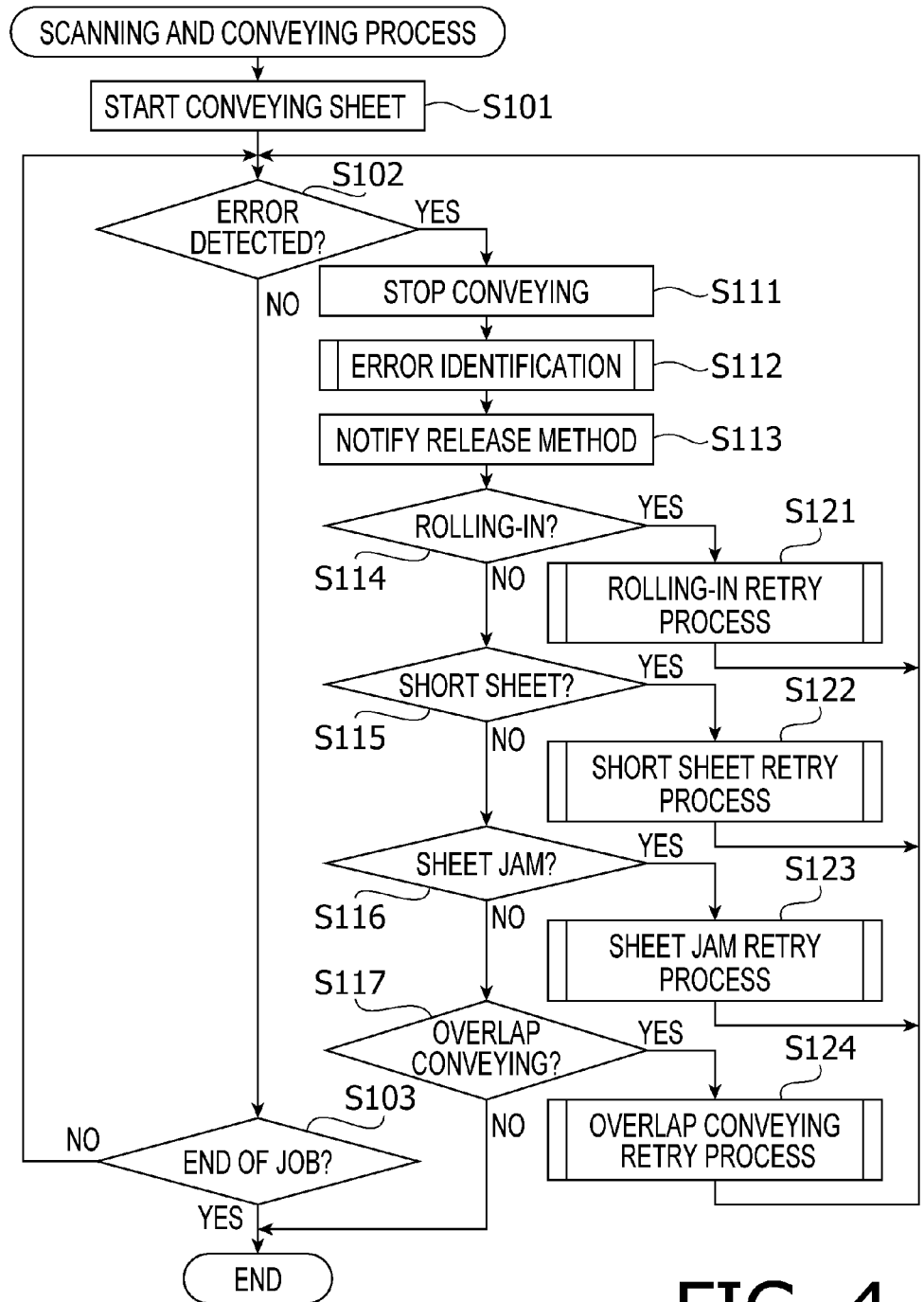
FIG. 4 is a flowchart illustrating a scanning and conveying process executed by the scanner according to the illustrative embodiment of the disclosures.
Figure 5:
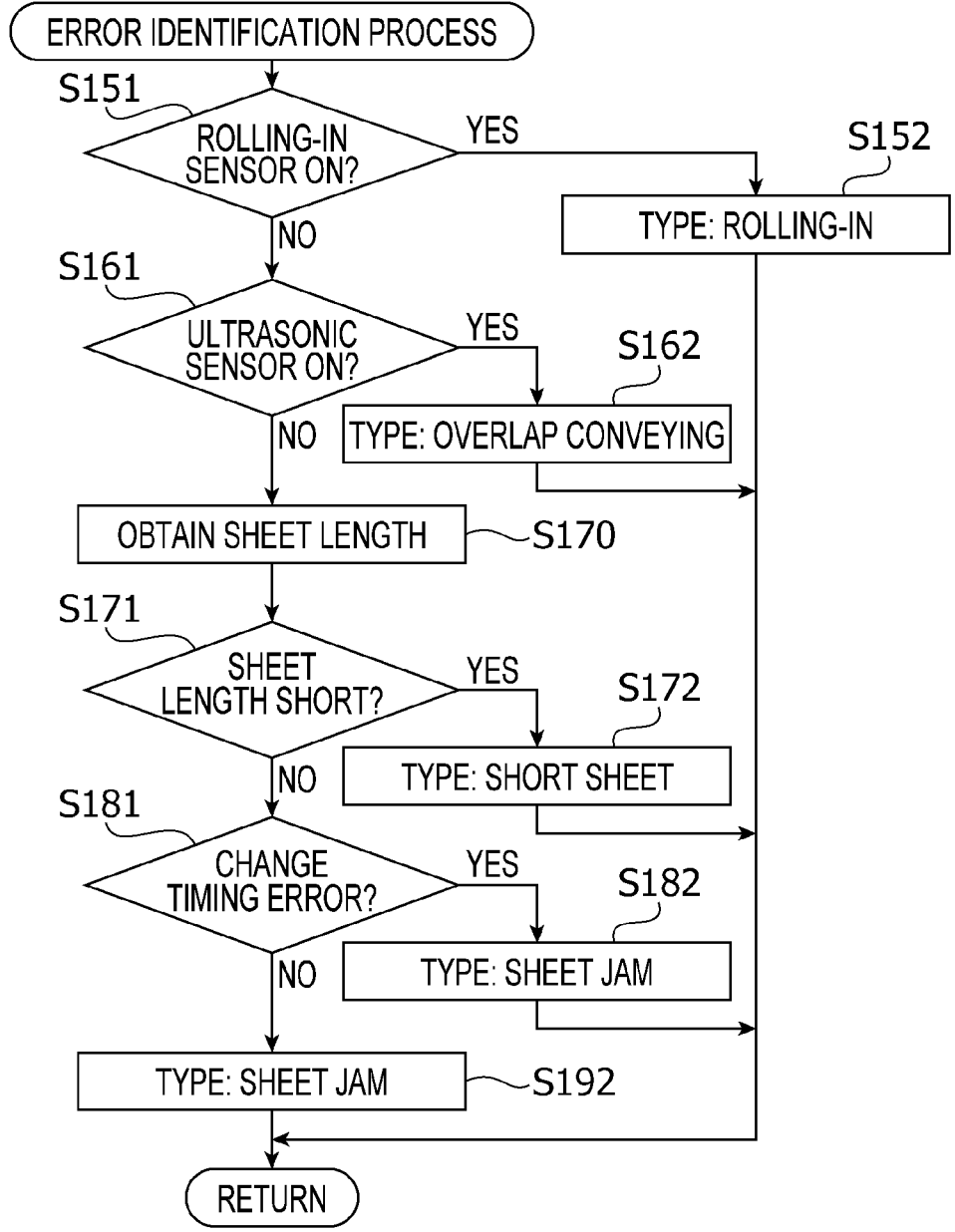
FIG. 5 is a flowchart illustrating an error identification process executed by the scanner according to the illustrative embodiment of the disclosures.

FIG. 5 shows details of the error identification process which is called in S112 of FIG. 4. In the error identification process, the scanner 100 firstly determines whether the output of the rolling-in sensor 75 is an ON level (S151). When the output of the rolling-in sensor 75 is the ON level (S151: YES), which means that the degree of curling of the original sheet is relatively large and a part of the original sheet is outside the conveying path 61, the scanner 100 identifies that the type of the error is "rolling-in" in S152.

When the output of the rolling-in sensor 75 is an OFF level (S151: NO), the scanner determines whether the output of the ultrasonic sensor 81 is the ON level (S161). When the output of the ultrasonic sensor 81 is the ON level (S161: YES), the scanner identifies that the type of the error is "overlap conveying" in S162.

When the output of the ultrasonic sensor 81 is the OFF level (S161: NO), the scanner 100 obtains an original sheet length, which is a length in the conveying direction of the original sheet, in S170. The original sheet length is obtained, for example, by calculation based on a time period during which the output of the sheet sensor 71 exhibits the ON level continuously, and the conveying speed of the original sheet. When an error is detected after scanning of the original sheet has been completed, the original sheet length may be measured from the scanned image of the original sheet. It is noted that S170 is an example of a sheet length detecting process.

After execution of S170, the scanner 100 determines whether the original sheet length is shorter than the longest distance, along the conveying path 161, between the adjacent rollers (S171). According to the illustrative embodiment, it is assumed that the distance between the first conveying roller pair 63 and the second conveying roller pair 64 is the longest. When the original sheet length is shorter than the longest distance between the rollers (S171: YES), the original sheet would fall between the rollers and would not be conveyed. Therefore, in such a case, the scanner 100 identifies that the type of error is a "short sheet" in S172.

When the original sheet length is longer than the longest distance between the rollers (S171: NO), the scanner 100 determines whether there is a sensor which does not exhibit the change of presence/absence of the original sheet at a predetermined timing (S181). When there is a sensor which does not exhibit the change of presence/absence at a predetermined timing (S181: YES), since it is likely that there has occurred an idol rotation of the roller(s) or a sheet jam and the original sheet may not be conveyed, the scanner 100 identifies that the type of error is "sheet jam" in S182.

When there are no sensors which do not exhibit that the change of presence/absence of the original sheet at a predetermined timing (S181: NO), the scanner 100 cannot identify the type of the error, and thus, identifies that the type of error is "unidentified" in S192. For example, when an error has occurred as the cover is opened, the type of the error is identified as the "unidentified". After execution of S152, S162, S172, S182 or S192, the scanner 100 terminates the error identifying process, and returns to the reading and conveying process.

After execution of the error identification process in S112 of FIG. 4, the scanner 100 notifies a releasing method corresponding to the identified error (S113). For example, in S113, the scanner 100 may display a message encouraging the user to open the cover and remove the original sheet. It is noted that the releasing method may be a message displayed on the display 42, or a voice guidance.

After execution of S113, the scanner 100 executes a retry process corresponding to the identified error type. According to the illustrative embodiment, the scanner 100 determines whether the error type is the rolling-in or not (S114). When it is determined that the error type is the rolling-in (S114: YES), the scanner 100 executes a rolling-in retry process (S121) which is a process dealing with the rolling-in error. When it is determined that the error type is not the rolling-in error (S114: NO), the scanner 100 determines whether the error type is the short sheet or not (S115). When it is determined that the error type is the short sheet (S115: YES), the scanner 100 executes a short sheet retry process (S122) which is a process dealing with the short sheet error. When it is determined that the error type is not the short sheet error (S115: NO), the scanner 100 determines whether the error type is the sheet jam (S116). When it is determined that the error type is the sheet jam (S116: YES), the scanner 100 executes a sheet jam retry process (S123) which is a process dealing with the sheet jam error. When it is determined that the error type is not the sheet jam (S116: NO), the scanner 100 determines whether the error type is the overlap conveying or not (S117). When it is determined that the error type is the overlap conveying (S117: YES), the scanner 100 executes an overlap conveying retry process (S124) which is a process dealing with the overlap conveying error.

When it is determined that the error type is not the overlap conveying (S117: NO), that is, when the error type cannot be identified, the scanner 100 terminates the scanning and conveying process without executing a retry process. When the retry process has been executed (S121, S122, S123 or S124), the scanner 100 returns to S102, and repeats S102 and S103 until another error occurs or the job is completed.

Next, each of the retry process at S121, S122, S123 and S124 will be described in detail.

Figure 6:
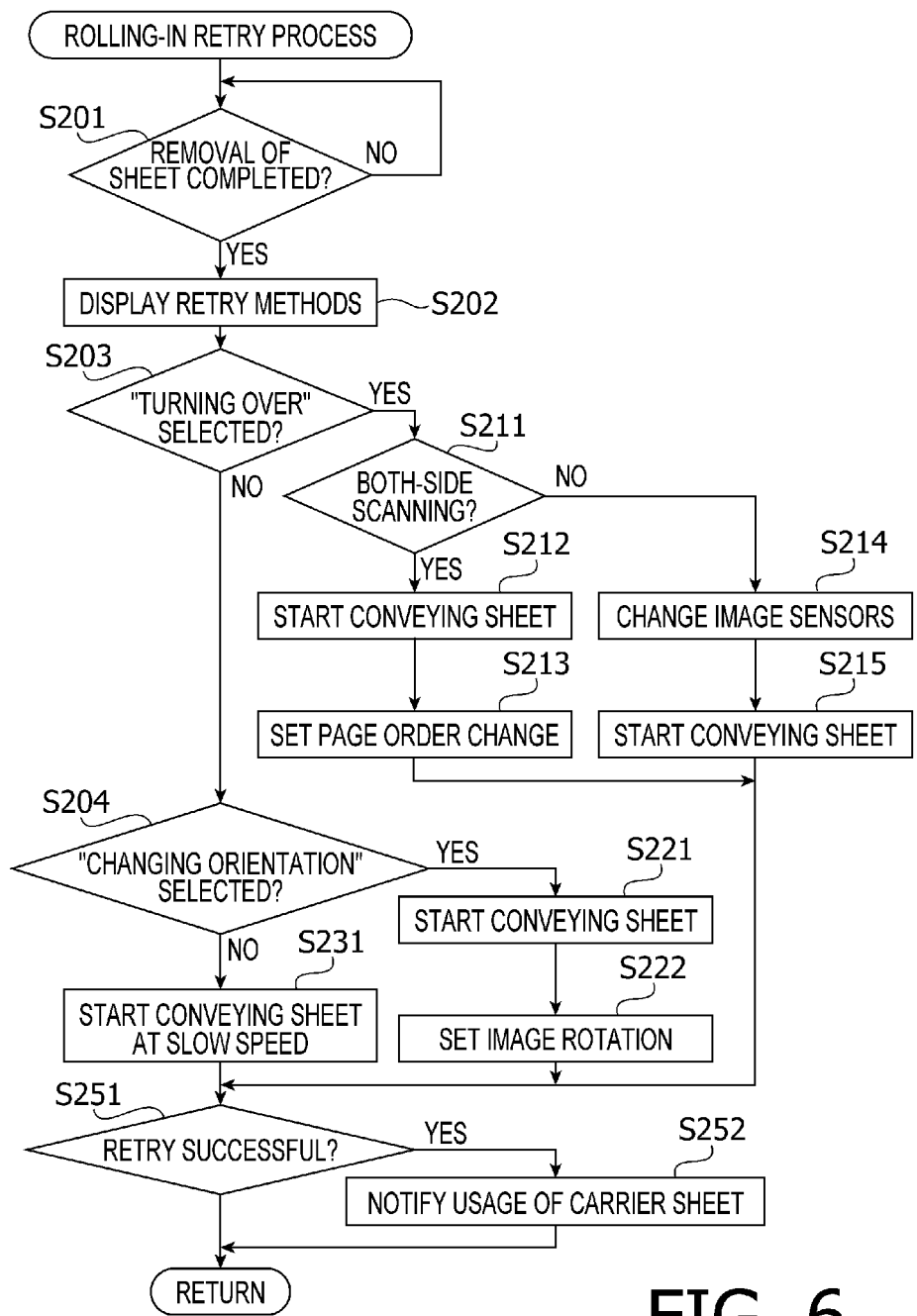
FIG. 6 is a flowchart illustrating a rolling-in retry process executed by the scanner according to the illustrative embodiment of the disclosures.

FIG. 6 illustrates the rolling-in retry process executed in S121 of FIG. 4. When the rolling-in retry process is executed, the scanner 100 firstly determines whether removal of the original sheet has completed (S201). It is noted that the removal of the original sheet can be determined, for example, when the sheet sensors 71 and 72, and the rolling-in sensor 75 output OFF level signals. It is noted that, when the removal of the original sheet has not been completed (S201: NO), the scanner 100 waits for removal of the original sheet.

Figure 7:
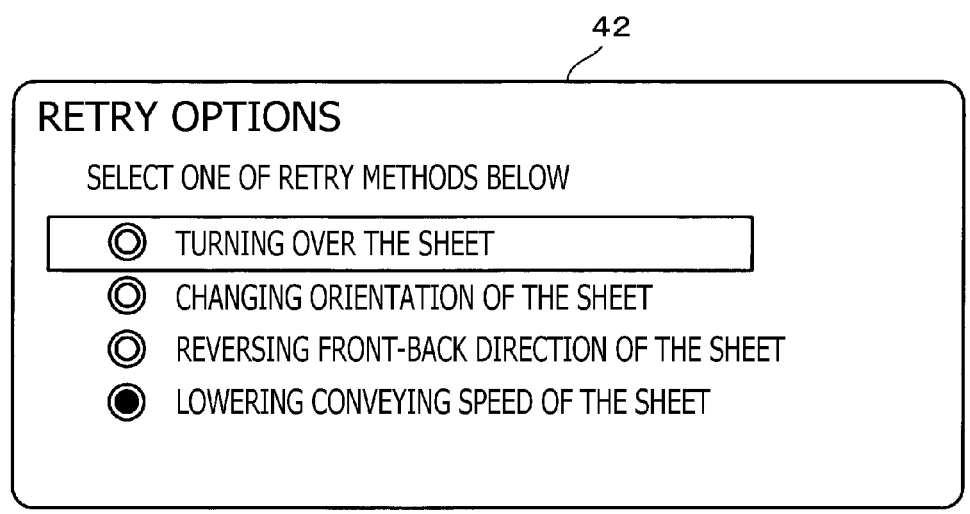
FIG. 7 shows an example of a displayed screen notifying a user of retry methods when a rolling-in error has occurred.

When removal of the original sheet has been completed (S201: YES), the scanner 100 displays (S202) a selection screen encouraging the user to select one of the retry methods on the display 42 as shown in FIG. 7. The scanner 100 displays a plurality of retry methods when the conveying error due to the rolling-in of a sheet has occurred. Different retry methods require different operations the user is supposed to perform and different operation of the scanner 100. Therefore, in S202, the scanner 100 notifies a recommendable one of the retry methods, and acquires the user selection.

According to the illustrative embodiment, as the retry methods to deal with the rolling-in error, four methods for user selection are displayed. The four retry methods are: a method of turning over the original sheet; a method of changing the orientation (portrait-landscape) of the original sheet; a method of reversing the front-back direction of the original sheet; and a method of lowering the conveying speed of the original sheet. It is noted that S200 is an example of the notification process.

When there are multiple retry methods, and a recommendable retry method is preliminarily determined, the scanner 100 displays the multiple retry methods with the recommendable retry methods being highlighted on the selection screen as shown in FIG. 7. As a method of highlighting, a text of the recommendable method may be surrounded by a rectangular frame as shown in FIG. 7, or any other applicable methods (e.g., the text of the recommendable method may be indicated with larger letters than the other letter and/or may be indicated with bold letters). Alternatively or optionally, the recommendable method may be arranged at a first line of the selectable methods. It is noted that the recommendable method may not be a predetermined one but one determined by the scanner 100 when the multiple retry methods are displayed based on various conditions at that stage.

After the user has selected the retry method, or after the start key is depressed when a retry method is being highlighted (selected), the scanner 100 determines whether the method of turning over the original sheet is selected (S203). It is noted that, by turning over the original sheet, a curling tendency of the original sheet is expected to be cured. Even if the curling tendency may not be cured well, if an initial curling tendency is directed downward, by turning over the original sheet, the curing tendency is then directed upward, in which case, the curling amount may not be increased as the original sheet is conveyed in comparison with a case where the curling tendency is remained downward. It is noted that, according to the illustrative embodiment, the rolling-in error is detected when the curling amount in the downward direction is relatively large. Accordingly, according to the illustrative embodiment, by setting the original sheet so that the curling tendency is reversed by turning over the sheet, a possibility of success of the retry is increased.

When the method of turning over the original sheet has been selected (S203: YES), the scanner 100 determines whether the current job is a both-side scanning job (i.e., a job set to scan both sides of the original sheet) (S211). When it is determined that the current job is the both-side scanning job (S211: YES), the scanner 100 starts conveying the original sheet (S212). When conveying of the original sheet is started, the scanner 100 starts scanning of the both sides of the original sheet with use of the image sensors 21 and 22. Further, the scanner 100 sets a change of the order of the pages scanned by the image sensors 21 and 22 (S213). When the change of the order of the pages scanned by the image sensors 21 and 22, after the scanner 100 scans image of the both surfaces of the original sheet with the image sensors 21 and 22, respectively, the scanner 100 reverses the order of the pages corresponding to the images respectively scanned with the image sensors 21 and 22. It is because, when the original sheet is turned over, the order of the pages corresponding to the both surfaces of the original sheet scanned with the image sensors 21 and 22 are reversed. Therefore, by reversing the order of pages after the images on both surfaces of the original sheet, the order of the pages of the scanned images are aligned appropriately. It is noted that S213 is an example of a sorting process.

When the both-side scanning is not set to the job, that is, when the job is a single-side scanning job (S211: NO), the scanner 100 switches the image sensor to be used for scanning from the image sensor 21 to the image sensor 22 (S214). Thereafter, the scanner 100 starts conveying the original sheet (S215). After conveying of the original sheet is started, the scanner 100 starts scanning of the image in accordance with conveyance of the original sheet with the image sensor 22. When the scanning job is the single-side scanning job, the order of the pages will not be reversed. Accordingly, in this case, the sorting of the order of the pages will not be executed. Further, since the surface of the original sheet to be scanned is directed to an opposite side, the image is scanned with the image sensor which is different from the image sensor used before the occurrence of the error.

When the method of turning over the original sheet has not been selected (S203: NO), the scanner 100 determines whether a method of changing the orientation, which includes at least a portrait orientation and a landscape orientation, of the original sheet (e.g., switching the orientation of the original sheet between the landscape orientation and the portrait orientation) is selected (S204). By changing the orientation of the original sheet, an end portion of the original sheet in a curling direction can be prevented from entering a nip between a roller pair, thereby the possibility of success of the retry being increased.

When the method of changing the orientation of the original sheet is selected (S204: YES), the scanner 100 starts conveying the original sheet (S221) as in S101. When conveying of the original sheet is started, the scanner 100 also start scanning of the original sheet with the image sensor 21 in accordance with the movement of the original sheet. Further, the scanner 100 makes a image rotation setting (S222). When the image rotation setting is made, the scanner 100 applies an image rotation to the image which has been scanned in accordance with the change of the orientation of the original sheet.

It is noted that, in FIG. 7, the retry methods include "changing orientation of the sheet" and "reversing front-back direction of the sheet" separately. The former is also regarded as a change of orientation by 90 degrees, and the latter can be regarded as a change of orientation by 180 degrees. Therefore, in FIG. 6, both methods are collectively determined in S204. For example, when the orientation of the original sheet has been changed between the landscape orientation and the portrait orientation, the scanner 100 applies the image rotation by 90 degrees. When the front-rear direction has been reversed, the scanner 100 applies the image rotation by 180 degrees. By applying the image rotation, the orientation of the images after the retry is started is aligned with the orientation of the images which were scanned before the retry. It is noted that S222 is an example of a second rotation process.

When the method of changing the orientation of the original sheet is not selected (S204: NO), the method of lowering the conveying speed of the original sheet must have been selected. In such a case, the scanner 100 starts an original sheet conveying operation at a slow speed in accordance with a setting made by the user (S231). When conveying of the original sheet is started, the scanner starts scanning of the original sheet, which is being conveyed at the changed (i.e., the slow) speed, with use of the image sensor 21.

After execution of S231, S222, S215, or S313, the scanner 100 determines whether the retry of scanning of the original sheet which has been reset. In other words, according to the illustrative embodiment, the scanner determines whether scanning of one original sheet immediately after restart of the scanning operation has completed successfully and the original sheet having been scanned is ejected, from the scanner 100, onto the catch tray 92.

When the scanner fails to retry with respect the reset original sheet (S251: NO), the scanner 100 causes the display 42 to display a notification encouraging the user to use the carrier sheets, which is a pair of transparent sheets configured to sandwich an original sheet of various types, as a recommendable user operation (S252). It is noted that S252 is an example of a re-notification process. When the carrier sheets are used, it is very likely that conveyance of the original sheet will be executed successfully, but usage of the carrier sheets is troublesome for the user. Therefore, according to the illustrative embodiment, retry methods other than the usage of the carrier sheets are notified firstly, and the method of using the carrier sheets is notified thereafter if the conveyance of the original sheet has not improved with the other methods. After execution of S252, or when the retry of the reset original has been succeeded (S251: YES), the rolling-in retry process is terminated and the scanner 100 returns to the reading and conveying process.

In the rolling-in retry process according to the illustrative embodiment, a plurality of retry methods are displayed and the user is encouraged to select one of the retry methods. This configuration may be modified such that only one retry method is displayed and a step of user selection may be omitted. Alternatively, when a plurality of retry methods are to be displayed, it may be unnecessary to display all of the four methods, but at least two of the methods may be displayed for user selection. Further, the number of the retry methods need not be limited to four as in the illustrative embodiment, but one or more additional retry method may be included for user selection.

Figure 8:
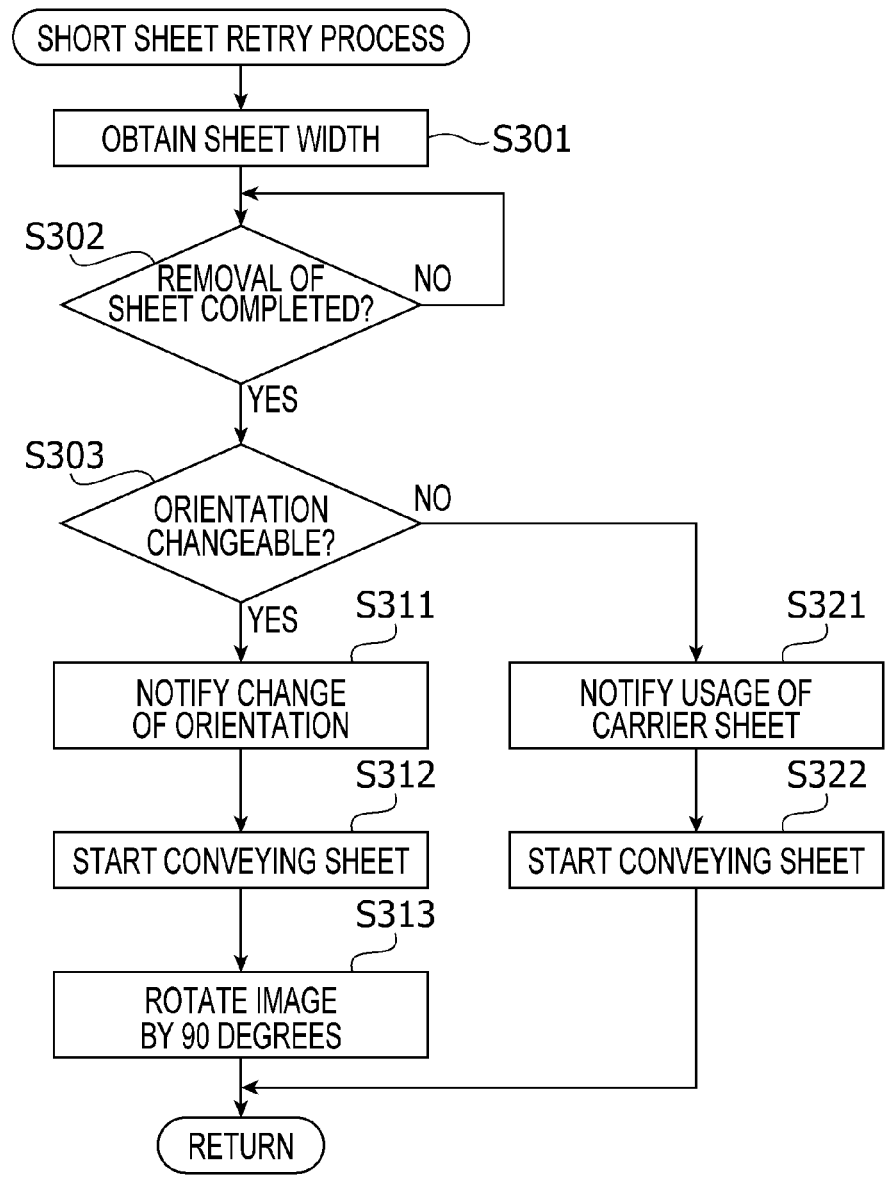
FIG. 8 is a flowchart illustrating a short sheet retry process executed by the scanner according to the illustrative embodiment of the disclosures.

In the short sheet retry process shown in FIG. 8, the scanner 100 obtains an original sheet width, which is a length, in a direction perpendicular to the conveying direction, of the original sheet that is the cause of the error (S301). The original sheet width is obtained by, for example, when there is an image having been scanned, or in a process of scanning, measuring the width of the image. When there in an input value of the original sheet width input by the user, the scanner 100 obtains the input value. It is noted that, when the scanner 100 cannot obtain the original sheet width, the process proceeds with the original sheet width being treated as an unknown width.

After execution of S301, the scanner determines whether removal of the original sheet has completed (S302) as in S201, and waits for completion of removal. When the original sheet has been removed (S302: YES), the scanner 100 determines whether the original sheet can be conveyed if the orientation thereof is changed (S303), based on the original sheet width obtained in S301. That is, in S303, when the original sheet width is longer than the longest distance between rollers, the scanner 100 determines that the original sheet can be conveyed after the orientation thereof is changed. When the original sheet width is shorter than the longest distance between the rollers, since the short sheet error would occur again, the scanner 100 determines that the original sheet cannot be conveyed. When the original sheet width is unknown, whichever decision may be made.

When it is determined that the original sheet can be conveyed after the orientation of the original sheet is changed (S303: YES), the scanner 100 causes the display 42 to notify a user that the original sheet should be set such that the orientation thereof is changed, as a recommendable operation which should be notified to the user (S311). By changing the orientation of the original sheet (i.e., by switching between the landscape orientation and the portrait orientation), the sheet length in the conveying direction changes, which may reduce the possibility that the original sheet falls between the conveying rollers. After execution of 5311, the scanner 100 starts conveying the original sheet as in S101 in response to user depression of the start key (S312). When conveying of the original sheet is started, the scanner 100 starts scanning of the original sheet in accordance with conveying of the original sheet with use of the image sensor 21, and rotate the scanned image by 90 degrees (S313). By rotating the scanned image, the orientation of the images after the error was occurred is aligned to that before the error. It is noted that S313 is an example of a first rotation process.

When it is determined that the original sheet cannot be conveyed by changing the orientation (S303: NO), the scanner 100 causes the display 42 to notify the user of an operation to use the carrier sheets as a recommendable operation (S321). After execution of S321, the scanner 100 starts conveying the original sheet (S322) as is done in S101. When conveying of the original sheet is started, the scanner 100 starts scanning the original sheet in accordance with the conveyance of the original sheet with use of the image sensor 21. After S322 or S311, the scanner 100 terminates the short sheet retry process and returns to the reading and conveying process. It is noted that S311 and S321 are examples of the notification process.

In the short sheet retry process, the retry method is determined based on whether the orientation of the original sheet can be changed or not. It is modified such that, as in the rolling-in retry process, a selection screen may be displayed to encourage the user to select a retry method from among the displayed ones. In such a case, for example, the change of the orientation may be recommended when the orientation of the original sheet can be changed, while the usage of the carrier sheets may be recommended when the orientation of the original sheet cannot be changed or when it is unknown whether the orientation of the original sheet can be changed or not.

In the short retry process, it is determined whether the orientation of the original sheet can be changed in S303. It may be possible to omit the determination in S303. That is, when the removal of the original sheet has completed (S302: YES), the scanner 100 may executed S311. Further, in S303, the original sheet width is compared with the longest distance between the rollers. This may be modified such that, for example, the width and the length of the original sheet may be compared. In such a case, when it is determined that the length of the original sheet is longer than the original sheet width, the scanner 100 proceeds to 5311 since the possibility of the retry is higher when the length of the original sheet is longer than the original sheet width. On the other hand, when the original sheet width is longer than the length of the original sheet, even if the orientation of the original sheet is changed, the short sheet error will occur again. Therefore, in such a case, the scanner 100 may proceed to S321.

Figure 9:
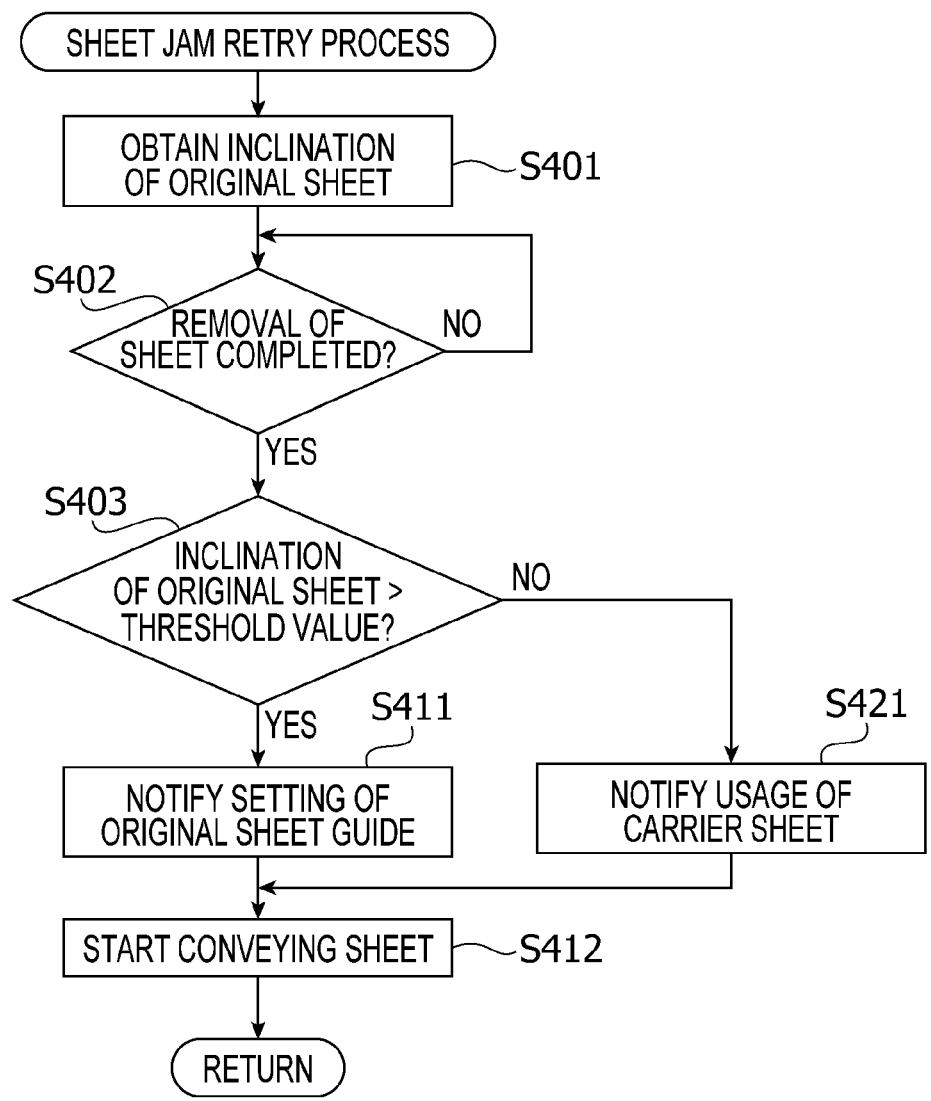
FIG. 9 is a flowchart illustrating a sheet jam retry process executed by the scanner according to the illustrative embodiment of the disclosures.

In the sheet jam retry process shown in FIG. 9, the scanner 100 firstly obtains an inclination of the original sheet causing the error (S401). For example, when there is an image scanned from the original sheet, or an image subject to scanning of the original sheet causing the error, the scanner 100 obtains the inclination based on the image. If there are a plurality of sheet sensors in an axial direction of the conveying roller, the inclination may be obtained based on differences of timings at which respective sensors detect presence of the original sheet. When the inclination of the original sheet has not been obtained, the process proceeds with the inclination of the original sheet remained unknown. It is noted that S401 is an example of an inclination detecting process.

After S401, the scanner 100 determines, as in S201, whether removal of the original sheet has been completed (S402). If the original sheet has not been completed (S402: NO), the scanner 100 awaits completion of removal of the original sheet. When it is detected that the original sheet has been removed (S402: YES), the scanner determines whether the inclination of the original sheet obtained in S401 is greater than a threshold value (S403).

When it is determined that the inclination of the original sheet is greater than the threshold value (S403: YES), the cause of the jam is determined that the inclination of the original sheet is too large, and thus the type of the error is determined that the jam due to too large inclination of the original sheet. In such a case, the scanner 100 causes the display 42 to display a notification encouraging the used to set an original sheet guide of the original sheet tray 91 (S411). It is noted that, by setting the original sheet guide, the inclination of the original sheet is suppressed and a possibility of success of the retry is increased.

When it is determined that the inclination of the original sheet is less than the threshold value (S403: NO), it is not so effective even though the original sheet guide is set. In such a case, the scanner 100 causes the display 42 to display a notification encouraging the user to use the carrier sheets as a recommendable operation (S421). After S421 or S411, the scanner 100 starts, as in S101, conveying the original sheet (S412). When the conveyance is started, the scanner executes scanning in accordance of conveyance of the original sheet with use of the image sensor 21. After S412, the scanner 100 terminates the sheet jam retry process, and returns to the reading and conveying process. It is noted that S411 and S412 are examples of the notification process.

In the sheet jam retry process described above, the inclination of the original sheet is obtained, and different retry methods are notified depending on the degree of the inclination. This notification may be modified such that only one retry method is notified regardless of the degree of the inclination. For example, when the original sheet is removed (S402: YES), the scanner 100 may proceeds to S411. Further, the retry method need not be limited to the guide setting or usage of the carrier sheets, but lowering of the conveying speed may be employed and notified. Alternatively, a plurality of retry methods are notified and the user may be encouraged to select one of the notified methods.

According to the above-described illustrative embodiment, after the error is the sheet jam, it is determined whether the sheet jam has occurred due to a relatively large inclination of the original sheet in the sheet jam retry process. This configuration may be modified such that the inclination of the original sheet is firstly obtained, the degree of the inclination is determined, and then the sheet jam due to the relatively large amount of inclination is separately identified. In such a modification, detection of the inclination and determination of the degree of the inclination are not executed in the sheet jam retry process. Instead, a retry process when the inclination is relatively large (S411, S412) and a retry process when the inclination is not large (S421, S412) may be prepared, and executed depending on necessity.

Figure 10:
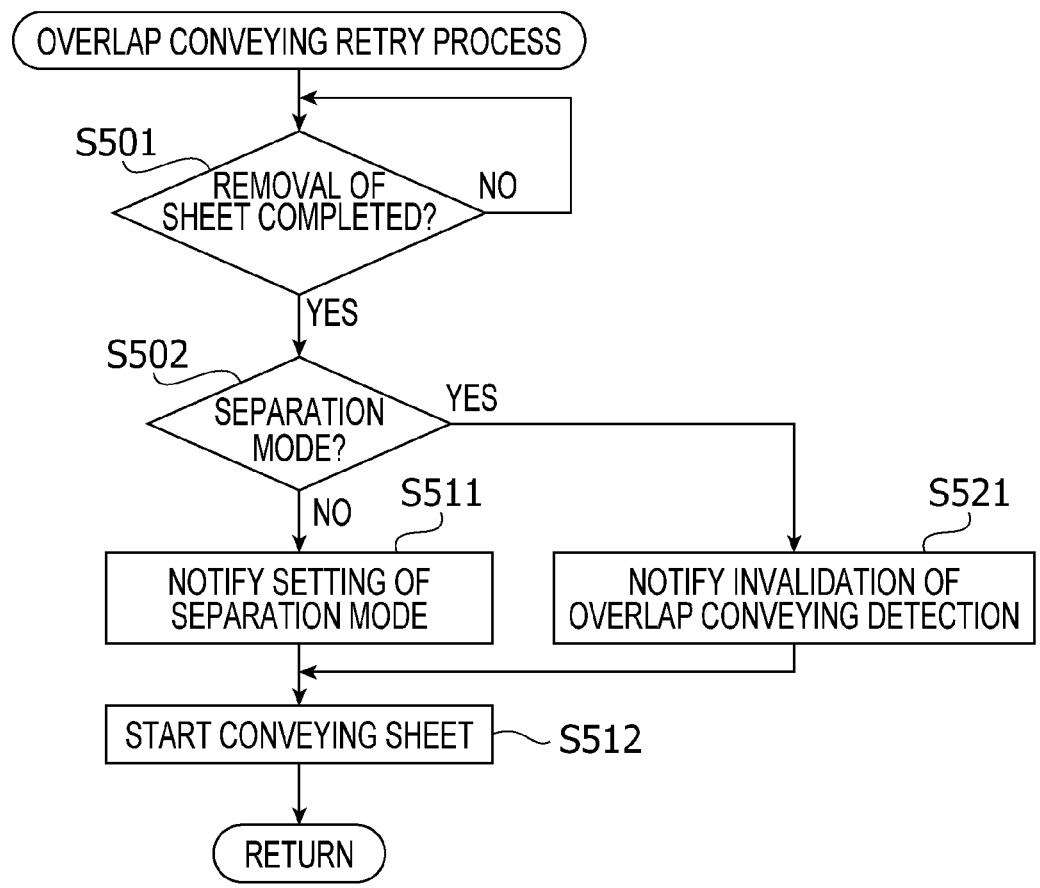
FIG. 10 is a flowchart illustrating an overlap conveying retry process executed by the scanner according to the illustrative embodiment of the disclosures.

In the overlap conveying process shown in FIG. 10, the scanner 100 firstly determines, as in S201, whether removal of the original sheet has been completed (S501). When the original sheet has been removed (S501: YES), the scanner 100 determines whether the original sheet which caused the error was conveyed in the separation mode (S502).

When it is determined that the original sheet was conveyed in the non-separation mode (S502: NO), the scanner 100 causes the display 42 to display a notification encouraging the user to set the separation mode as an operation recommended to the user (S511).

When it is determined that the original sheet was conveyed in the separation mode (S502: YES), the scanner 100 causes the display 42 to display a notification encouraging the user to invalidate detection of the overlap conveying as an operation recommended to the user (S521). When the sticky tag or tag seal is adhered on the original sheet, or when the original sheet is folded, the overlap conveying error may be detected. Accordingly, when the overlap conveying error is detected in the separation mode, the scanner 100 encourages the user to invalidate detection with the overlap conveying sensor. With this configuration, the possibility of successful scanning is increased even when such an original sheet (e.g., an original sheet on which the tag seal is applied or a folded original sheet) is scanned.

After execution of S521 or S511, the scanner 100 starts, as in S101, conveying the original sheet (S512). When conveying of the original sheet is started, the scanner 100 starts scanning with use of the image sensor 21 in accordance with conveyance of the original sheet. After execution of S512, the scanner 100 terminates the overlap conveying process, and returns to the scanning and conveying process. It is noted that S511 and S521 are examples of a notification process.

In the overlap conveying retry process described above, different notifications are made depending on whether the operation mode is the separation mode or the non-separation mode. This configuration may be modified such that a notification encouraging the user to invalidate the detection of overlap conveying regardless of the operation mode of the separation roller pair 62. In such a case, the scanner 100 may proceed to S521 after completion of removal of the original sheet (S501: YES). Further, the retry method needs not be limited to setting of the separation mode or invalidation of overlap conveying. For example, usage of the carrier sheet may be notified as the retry method. Alternatively, a plurality of retry methods may be notified and the user may be encouraged to select one of the plurality of retry methods.

As described in detail, when an error which causes stoppage of conveyance of the original sheet has occurred, the scanner 100 according to the illustrative embodiment identifies the type of the error. Then, when a retry operation is executed to the original sheet which has caused the error, an operation which might increase a success rate in the retry is notified to the user based on the type of the error. With this configuration, a possibility of repetition of the same error can be reduced.

It is noted that the above-described illustrative embodiment is only an example and is not intended to limit the aspects of the disclosures. Accordingly, the aspects of the disclosure can be modified in various ways without departing from a scope of the disclosures. For example, the scanning apparatus needs not be limited to a scanner, but may include any devices such as a copier, an MFP (multi-functional peripheral) and a facsimile machine, which makes use of the scanning function. Further, the aspects of the disclosures also applicable to a device having a sheet conveying function such as a printing function configured to print an image on a sheet which is being conveyed.

It is noted that the processes described above may be executed by a single CPU, a plurality of CPU's, hardware such as an ASIC (application-specific integrated circuit) and/or a combination thereof. Further, the processes described above may be provided in various forms, such as a recording medium storing programs which cause a CPU to execute the above-described processes, or methods defining the above-described processes.

According to the illustrative embodiment, the scanner 100 has a plurality of image sensors, and is configured to executes both-side scanning. It is noted that the scanner needs not be limited to such a scanner, but may be one provided with only one image sensor and a conveying direction switching mechanism to reverse the conveying direction of the original sheet so that images on the both surfaces of the original sheet can be scanned with the single image sensor. Alternatively, the scanner may be configured to scan only one surface of the original sheet with a single image sensor.

According to the above-described illustrative embodiment, the rolling-in sensor 75 and the sheet sensors 71, 72 and 73 are transmission sensors provided with movable bodies. Aspects of the disclosures need not be limited to such a configuration, and any sensors can be used as far as they can detect presence/absence of the original sheet at respective detection positions. Further, according to the illustrative embodiment, an ultrasonic sensor is employed to detect the overlap conveying of the original sheets. It is noted that the sensor detecting the overlap conveying needs not be limited to the ultrasonic sensor, but any sensor can be employed as far as it can detect occurrence of the overlap conveying.

According to the illustrative embodiment, the rolling-in sensor 75 is arranged around a position which is on a downstream side with respect to the separation roller pair 62 and below the conveying path 61. It is noted that the position of the rolling-in sensor 75 needs not be limited to this position. For example, the rolling-in sensor 75 may be arranged above the conveying path 61. Alternatively, the rolling-in sensor 75 may be arranged around a position which is on the downstream side with respect to the first conveying roller pair 63 of the second conveying roller pair 64.

According to the illustrative embodiment, recommended operations are notified to the user by displaying messages on the display 42. This may be modified such that the notifications may be made by a voice guidance, optionally or alternatively.

According to the illustrative embodiment, the rolling-in error, the short sheet error, the sheet jam error and the overlap conveying are detected as types of the errors. It only examples of the error types and the aspects of the disclosures need not be limited to the above configuration.

According to the illustrative embodiment, when the type of the error is unknown (S117: NO), the scanner 100 terminates the conveying and scanning process without executing the retry process. This can be modified such that such that the scanner 100 causes usage of the carrier sheet on the display 42 as a notification and starts executing the scanning operation. In this case, after starting the scanning operation, the scanner 100 may return to S102.

According to the illustrative embodiment, when the retry is executed by changing the orientation or surface of the original sheet, the order of pages is changed or an image is rotated depending on the necessity. Such a processing of image may be omitted. It is of course convenient when the above processing is executed.

According to the illustrative embodiment, when there are subsequent original sheets in addition to the original sheet to which the error has occurred and which sheet is subject to the retry method, the same retry method as selected is applied to the subsequent original sheets so that the subsequent sheets are scanned and conveyed in accordance with the selected retry method.

According to the illustrative embodiment, when there are a plurality of retry methods, the user is encouraged to select one of the plurality of methods, and scanning and conveying of the original sheet are executed in accordance with the selected retry method. Aspects of the disclosures need not be limited to such a configuration. For example, the embodiment may be modified such that the user may select multiple retry methods from among the plurality of retry methods if the multiple retry methods can be combined, and scanning and conveying the original sheet may be executed in accordance with the combination of the retry methods.

For example, the user may be allowed to select the "lowering conveying speed of the sheet" and the "changing orientation of the sheet" as the multiple retry methods. In such a case, the scanner 100 may convey the original sheet at the lowered conveying speed, and the scanned image is rotated based on the changed orientation of the image. In another example, the user may select the "turning over the sheet" and the "reversing front-back direction of the sheet" as the multiple retry methods. In this case, the scanner 100 rotate the scanned image in accordance with the changed orientation of the original sheet. Further, when the one-side scanning is executed, the scanner 100 switches the image sensor to be used for scanning. When the both-side scanning is executed, the scanner 100 may change the order of the scanned images.

Figure 11:
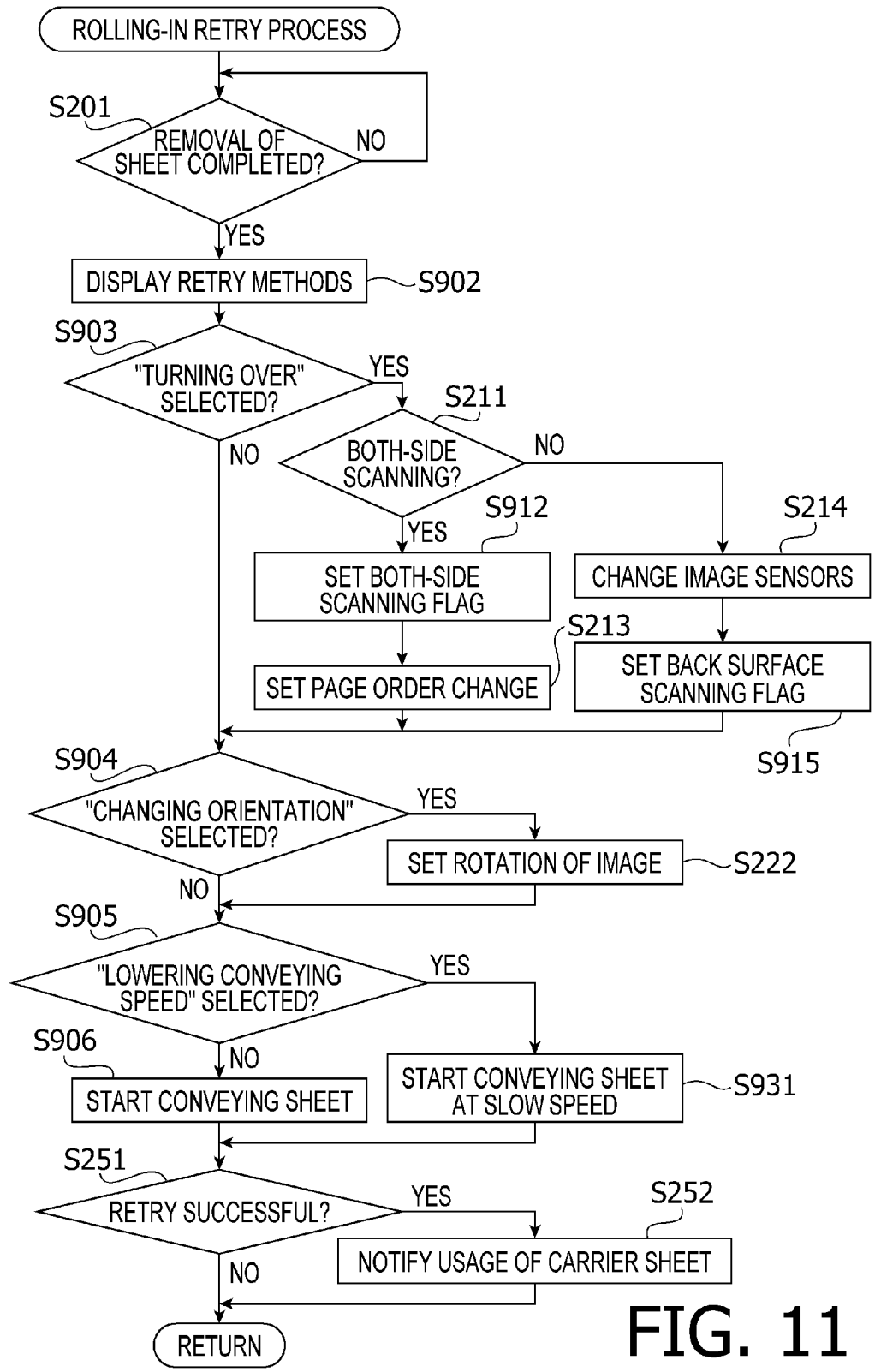
FIG. 11 is a flowchart illustrating a rolling-in retry process executed by the scanner according to a modified illustrative embodiment of the disclosures.

As an example of a case where multiple retry methods are selectable, a modified rolling-in retry process is described, referring to FIG. 11. It is noted that, in FIG. 11, steps similar to those in FIG. 6 are assigned with the same step numbers and description thereof will be omitted for brevity.

Figure 12:
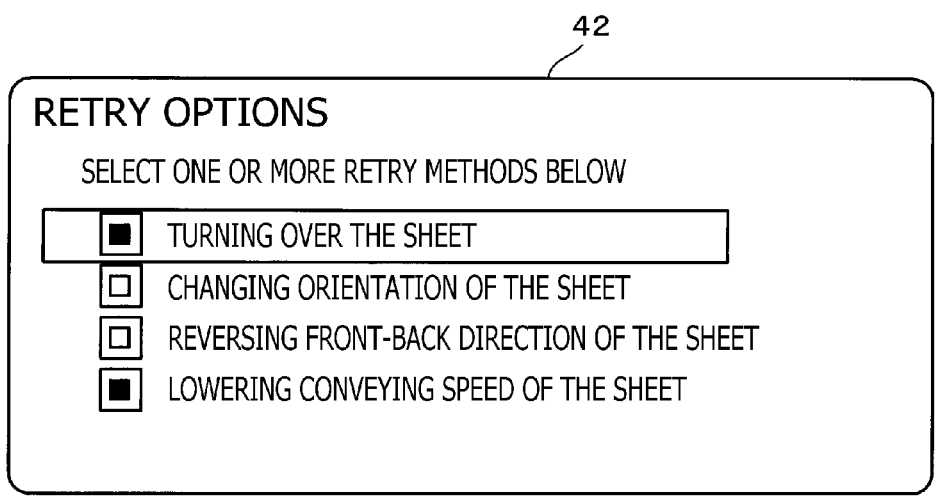
FIG. 12 shows an example of a displayed screen notifying a user of retry methods when the rolling-in error has occurred according to the modified illustrative embodiment of the disclosures.

In the modified rolling-in retry process shown in FIG. 11, after removal of the original sheet has been completed (S201: YES), the scanner 100 causes the display 42 to display a selection screen encouraging the user to select multiple retry methods (S902). In this case, the scanner 100 causes the display 42 to display a selection screen as shown in FIG. 12. In the selection screen shown in FIG. 7, the user can select only one retry method, while in the section screen shown in FIG. 12, the user is allowed to select multiple retry methods.

When selection of the retry methods has been completed, the scanner 100 determines whether each of the retry methods is selected. According to the modified embodiment, the scanner 100 firstly determines whether the "turning over the sheet" has been selected or not (S903).

When the "turning over the sheet" has been selected (S903: YES), the scanner 100 determines whether the scanning job is the both-side scanning job (S211). When the scanning job is the both-side scanning job (S211: YES), the scanner sets a flag indicative of the both-side scanning (S912). Further, the scanner 100 sets sorting of the order of the pages (S213). When the scanning job is the one-side scanning job (S211: NO), the scanner 100 switches the image sensor to be used for scanning from the image sensor 21 to the image sensor 22 (S214). Then, the scanner sets a flag indicative of scanning of a back surface (S915). It is noted that, in this modified embodiment, the scanner 100 only sets the flags in S912 and S915, and does not start conveying or scanning the original sheet in S912 and S915.

After execution of S213 or S915, or when the "turning over the sheet" has not selected (S903: NO), the scanner 100 determines whether the "changing orientation of the sheet" has been selected (S904). It is noted that, in FIG. 12, the retry methods include "changing orientation of the sheet" and "reversing front-back direction of the sheet" separately. The former is also regarded as a change of orientation by 90 degrees, and the latter can be regarded as a change of orientation by 180 degrees. Therefore, in FIG. 11, both methods are collectively determined in S904.

When it is determined that the method of changing the orientation of the sheet (i.e., "changing orientation of the sheet" and/or "reversing front-back direction of the sheet") has been selected (S904: YES), the scanner sets rotation of the scanned image (S222).

After execution of S222, or when it is determined that the method of changing the orientation of the sheet (i.e., "changing orientation of the sheet" or "reversing front-back direction of the sheet") has not been selected (S904: NO), the scanner 100 determines whether the "lowering conveying speed of the sheet" has been selected (S905). When it is determined that the "lowering conveying speed of the sheet" has been selected (S905: YES), the scanner 100 starts conveying the original sheet at the lowered speed (S931). When conveying of the original sheet has been started, the scanner 100 also starts scanning the original sheet in accordance with conveyance of the original sheet. At this stage, when the flag indicative of execution of the both-side scanning is set (which has been set in S912), the scanner 100 starts scanning with use of both the image sensors 21 and 22. When the flag indicative of execution of the scanning of the back surface (which has been set in S214), the scanner starts scanning with use of the image sensor 22 to scan the back surface of the original sheet.

When the "lowering conveying speed of the sheet" has not been selected (S905: NO), the scanner starts conveying the original sheet without changing the conveying speed (S906). When conveying the original sheet is started, the scanner 100 starts scanning the original sheet in accordance with conveyance of the original sheet. In S906, as in S931, the scanner 100 starts scanning in accordance with the flags set in S912 and/or S214.

After execution of S906 or S931, the scanner 100 determines whether retry for the original sheet has been executes successfully (S251). Steps S251 onwards are similar to those in FIG. 6 and will not be repeated for brevity. As in the modified embodiment, when multiple methods can be selected, various ways of retry methods can be executed, and it is expected that occurrence of errors are well suppressed.

What is claimed is:

1. A scanning apparatus, comprising:
 a conveyer having a plurality of conveying rollers and configured to convey an original sheet;
 a scanning device configured to scan an image on the original sheet;
 a sensor configured to detect an error which causes stoppage of conveyance of the original sheet by the conveyer; and
 a controller,
 the controller being configured to execute:
 a detection process of detecting, based on an output of the sensor, one of a plurality of errors, which causes stoppage of conveying the original sheet by the conveyer, distinctively from the other of the plurality of errors;
 an identifying process of identifying a type of the one of the plurality of errors detected in the detecting process;
 a notification process of notifying a user of an operation to be executed by the user, depending on the type of the one of the plurality of errors identified by the identifying process, to cause the conveyer to re-convey the original sheet that has been stopped; and
 a sheet length detection process of detecting a sheet length, which is a length of the sheet in a sheet conveying direction, of the original sheet conveyed by the conveyer,
 wherein the controller detects an error in the detection process and identify that the type of error is a short sheet error in the identifying process when the sheet length detected in the sheet length detection process is shorter than a distance between two conveying rollers which are adjacent to each other in the sheet conveying direction, and
 wherein the controller notifies an operation of changing an orientation of the original sheet when the error is identified to be the short sheet error in the identifying process, the orientation including at least a portrait orientation and a landscape orientation.

2. The scanning apparatus according to claim 1,
 further comprising an inside-path sheet sensor which is configured to output different signals depending on whether the original sheet is present or absent at a predetermined position on the conveying path of the conveyer,
 wherein the controller is further configured to execute a sheet length detection process of detecting a length of the original sheet, which is conveyed by the conveyer, in the conveying direction,
 wherein the controller detects an error in the detection process when it is determined, based on the output of the inside-path sheet sensor, a change between the presence/absence of the original sheet does not occur at a predetermined timing, and
 wherein the controller identifies that the type of error is the short sheet error in the identifying process when the sheet length detected in the sheet length detection process is shorter than a distance between two conveying rollers which are adjacent to each other in the sheet conveying direction,
 wherein the controller notifies an operation of changing an orientation of the original sheet by switching longer sides and shorter sides when the short sheet error is identified in the identifying process when the error is identified to be the short sheet error in the identifying process, the orientation including at least a portrait orientation and a landscape orientation.

3. The scanning apparatus according to claim 1,
 wherein the controller is further configured to execute a sheet width detection process of detecting a sheet width which is a length of the sheet in a direction perpendicular to the sheet conveying direction, and
 wherein, when it is determined in the error is the short sheet error in the identifying process, and when the sheet width is detected in the sheet width detection process is longer than a distance between two conveying rollers which are adjacent to each other, the controller notifies an operation of changing an orientation of the original sheet by switching longer sides and shorter sides in the notifying process.

4. The scanning apparatus according to claim 1,
 wherein the controller is further configured to execute a first rotating process in which, when the controller has caused the scanning device to scan the original sheet conveyed by the conveyer after notified the user to change the orientation of the original sheet in the notification process, the controller rotates the scanned image so that the orientation of the scanned image is aligned with the orientation of scanned images of original sheets which were scanned before the error was detected.

5. A scanning apparatus, comprising,
 a conveyer having a plurality of conveying rollers and configured to convey an original sheet;
 a scanning device configured to scan an image on the original sheet; and
 a controller,
 the controller being configured to execute:
 a detection process of detecting an error which causes stoppage of conveying the original sheet by the conveyer;
 an identifying process of identifying a type of the error in the detecting process;
 a notification process of notifying a user of an operation to be executed by the user, depending on the type of the error identified by the identifying process, to cause the conveyer to re-convey the original sheet that has been stopped; and
 an outside-path sheet sensor configured to output different signals depending on whether the original sheet is present/absent at a detection position which is located outside the conveying path of the conveyer in a specific direction which is perpendicular to both the conveying direction and the axial direction of the conveying roller,
wherein the controller is configured to:
  detect the error in the detection process and identify that the error is caused by the original sheet being caught in the roller in the identification process when the outside-path sheet sensor outputs the signal indicating that the original sheet is present at the specific position; and
  notify, in the notification process, the user of an operation to set the original sheet by at least changing the orientation of the original sheet and turning over the original sheet, the orientation including at least a portrait orientation and a landscape orientation.

6. The scanning apparatus according to claim 5,
wherein the outside-path sheet sensor is arranged above or below the conveying path in the specific direction,
wherein the scanning device includes:
  a first scanning unit configured to scan a first surface of the original sheet which is being conveyed by the conveyer; and
  a second scanning unit configured to scan a second surface of the original sheet which is being conveyed by the conveyer,
wherein the controller is configured to notify, in the notification process, the user of an operation to set the original sheet by turning over the original sheet.

7. The scanning apparatus according to claim 6,
wherein the controller is configured to scan the original sheet using one of the first scanning unit and the second scanning unit which is different from one being used before the error was detected when the one-side scanning mode is set and after the controller notified, in the notification process, the user of an operation to set the original sheet by turning over the original sheet.

8. The scanning apparatus according to claim 6,
wherein the controller is configured to execute a sorting process of changing an order of an image scanned by the first scanning unit and an image scanned by the second scanning unit, when the both-side scanning mode is set and the controller caused the scanning device to scan the original sheet conveyed by the conveyer after the controller notified, in the notification process, the user of an operation to set the original sheet by turning over the original sheet.

9. The scanning apparatus according to claim 5,
wherein the controller is configured to notify, in the notification process, the user of an operation to set the original sheet by changing the orientation of the original sheet.

10. The scanning apparatus according to claim 9,
wherein the controller is configured to execute a second rotating process of rotating a scanned image of the original sheet to be aligned with an orientation of the scanned images which were scanned before the error was detected, after the controller notified, in the notification process, the user of an operation to set the original sheet by changing the orientation of the original sheet and caused the scanning device to scan the image of the original sheet conveyed by the conveyer.

11. The scanning apparatus according to claim 5,
the controller is configured to notify, in the notification process, the user of an operation to set the conveying speed of the original sheet to a lower speed.

12. The scanning apparatus according to claim 5,
wherein the controller execute a re-notification process of re-notifying the user of usage of a carrier sheet when an error is detected in the detection process during conveyance of the original sheet after the notification was notified in the notification process.

13. A scanning apparatus, comprising:
a conveyer having a plurality of conveying rollers and configured to convey an original sheet;
a scanning device configured to scan an image on the original sheet;
a sensor configured to detect an error which causes stoppage of conveyance of the original sheet by the conveyer; and
a controller,
the controller being configured to execute:
a detection process of detecting, based on an output of the sensor, one of a plurality of errors, which causes stoppage of conveying the original sheet by the conveyer, distinctively from the other of the plurality of errors;
an identifying process of identifying a type of the one of the plurality of errors detected in the detecting process; and
a notification process of notifying a user of an operation to be executed by the user, depending on the type of the one of the plurality of errors identified by the identifying process, to cause the conveyer to re-convey the original sheet that has been stopped;
further comprising an inside-path sheet sensor configured to output different signals depending on whether the original sheet is absent/present at a predetermined position on the conveying path of the conveyer,
wherein the controller is further configured to:
  execute an inclination detecting process of inclination of the original sheet conveyed by the conveyer;
  detect an error in the detection process when a switching between the absence and presence of the original sheet based on the inside-path sheet sensor does not occur at a predetermined timing and identify that the error is the sheet jam error when the inclination detected in the inclination detection process is greater than a predetermined inclination; and
  notify, in the notification process, the user of an operation to set an original sheet guide when it is identified that the error is the sheet jam error.

14. The scanning apparatus according to claim 13,
further comprising an inside-path sheet sensor configured to output different signals depending on whether the original sheet is absent/present at a predetermined position on the conveying path of the conveyer,
wherein the controller is configured to:
  detect an error in the detection process and identify that the error is a sheet jam error in the identification process when a switching between the absence and presence of the original sheet based on the inside-path sheet sensor does not occur at a predetermined timing; and
  notify, in the notification process, the user of an operation to lower the conveying speed of the original sheet when it is identified in the identification process that the sheet jam error has occurred.

15. A scanning apparatus, comprising:
a conveyer having a plurality of conveying rollers and configured to convey an original sheet;
a scanning device configured to scan an image on the original sheet;
a sensor configured to detect an error which causes stoppage of conveyance of the original sheet by the conveyer; and a controller, the controller being configured to execute:

a detection process of detecting, based on an output of the sensor, one of a plurality of errors, which causes stoppage of conveying the original sheet by the conveyer, distinctively from the other of the plurality of errors;

an identifying process of identifying a type of the one of the plurality of errors detected in the detecting process; and a notification process of notifying a user of an operation to be executed by the user, depending on the type of the one of the plurality of errors identified by the identifying process, to cause the conveyer to re-convey the original sheet that has been stopped;

further comprising:

a sheet tray configured to accommodate a plurality of the original sheets;

a separation roller pair configured to feed the plurality of the original sheets accommodated in the sheet tray toward the conveying path one by one; and an overlap conveying sensor configured to output different signals depending on whether overlap conveying in which a plurality of original sheet are conveyed in an overlapped state, is occurring, wherein the separation roller pair is configured to be operable in:

a first mode in which one roller of the separation roller pair is caused to be driven to rotate by another roller of the separation roller pair; and a second mode in which the one roller of the separation roller pair is caused to rotate in a direction opposite to the other roller of the separation roller pair, and wherein the controller is further configured to:

detect an error in the detection process and identify the error is the overlap conveying error, when the overlap conveying sensor outputs a signal indicating occurrence of the overlap conveying; and notify, in the notification process, the user of an operation of setting the second mode, when the error was detected in the detection process, the error is identified to be the overlap conveying error, and the first mode is set.

16. The scanning apparatus according to claim 15, further comprising an overlap conveying sensor configured to output different signals depending on whether overlap conveying, in which a plurality of original sheets are conveyed as being overlapped, is occurring, wherein the controller is configured to:

detect an error in the detection process and identify an overlap conveying error in the identification process when the overlap conveying sensor outputs a signal indicating occurrence of the overlap conveying; and notify, in the notification process, the user of an operation to invalidate the signal output by the overlap conveying sensor when the identification process identifies the overlap conveying error.

17. The scanning apparatus according to claim 15, wherein the controller is configured to notify, in the notification process, the user of an operation to set the signal output by the overlap conveying sensor to be invalidated, when the error was detected in the detection process, the error was identified to be the overlap conveying error in the identification process, and the second mode was set.

18. A sheet conveyer, comprising:

a conveyer configured to convey a sheet with user of a plurality of conveying rollers;

a sensor configured to detect an error which causes stoppage of conveyance of the original sheet by the conveyer; and a controller, wherein the controller is configured to execute:

a detection process of detecting, based on an output of the sensor, one of a plurality of errors, which causes stoppage of conveyance of the sheet by the conveyer, distinctively from the other of the plurality of errors;

an identification process of identifying a type of the one of the plurality of errors detected in the detection process;

a notification process of notifying a user of a recommendable operation to re-execute conveyance of the sheet, which has caused stoppage of the conveyance, based on the type of the one of the plurality of errors identified by the identification process; and a sheet length detection process of detecting a sheet length, which is a length of the sheet in a sheet conveying direction, of the original sheet conveyed by the conveyer, wherein the controller detects an error in the detection process and identify that the type of error is a short sheet error in the identifying process when the sheet length detected in the sheet length detection process is shorter than a distance between two conveying rollers which are adjacent to each other in the sheet conveying direction, and wherein the controller notifies an operation of changing an orientation of the original sheet when the error is identified to be the short sheet error in the identifying process, the orientation including at least a portrait orientation and a landscape orientation.

* * * * *